United States Patent
Boersma et al.

(10) Patent No.: US 8,373,109 B2
(45) Date of Patent: Feb. 12, 2013

(54) TEAT DETECTION DEVICE AND METHOD THEREWITH IN A MILKING DEVICE

(75) Inventors: Gerrit Boersma, Odijk (NL); Karel Van Den Berg, Maassluis (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 12/900,524

(22) Filed: Oct. 8, 2010

(65) Prior Publication Data

US 2011/0023785 A1    Feb. 3, 2011

Related U.S. Application Data

(63) Continuation-in-part of application No. 12/439,824, filed on Mar. 4, 2009, and a continuation of application No. PCT/NL2009/000084, filed on Apr. 7, 2009.

(30) Foreign Application Priority Data

Apr. 9, 2008 (NL) ...................................... 1035270

(51) Int. Cl.
*G06M 7/00* (2006.01)
*A01J 3/00* (2006.01)

(52) U.S. Cl. ..................................... 250/221; 119/14.08
(58) Field of Classification Search ................... 250/221; 119/14.08; 901/47
See application file for complete search history.

(56) References Cited

U.S. PATENT DOCUMENTS

| | | | |
|---|---|---|---|
| 5,934,220 A * | 8/1999 | Hall et al. ................... | 119/14.08 |
| 5,979,359 A * | 11/1999 | Hansson .................... | 119/14.08 |
| 7,098,441 B2 * | 8/2006 | Yamaguchi et al. .......... | 250/221 |
| 2007/0215052 A1 * | 9/2007 | Metcalfe et al. ........... | 119/14.08 |

FOREIGN PATENT DOCUMENTS

| | | |
|---|---|---|
| EP | 1253440 A1 | 10/2002 |
| JP | 10026667 A | 1/1998 |
| WO | 2004012269 A1 | 2/2004 |
| WO | 2008030086 A1 | 3/2008 |

OTHER PUBLICATIONS

International Search Report and Written Opinion of PCT/NL2009/000084, 2009.

* cited by examiner

*Primary Examiner* — Thanh Luu
(74) *Attorney, Agent, or Firm* — Coraline J. Haitjema; David P. Owen; Hoyng Monegier LLP

(57) ABSTRACT

The invention provides a detection device for determining position information from an object to the detection device, wherein the position information includes at least a distance from that object to the detection device. The detection device includes: a light source arranged to emit light; a control device arranged to control the light source; a light measuring device comprising a 2D classification of light sensitive elements and arranged to measure reflected light and to generate a corresponding measuring signal; a signal processing device arranged to process the measuring signal to position information, including distance information, of the object with respect to the detection device, wherein the signal processing device includes an object recognition device is configured to recognize at least one of: an udder, a teat, a and respective parts thereof, and wherein at least one of the light measuring device has an absolute sensitivity maximum with a wavelength between 400 and 570 nm, and the light source has an absolute emission maximum with a wavelength between 400 and 570 nm.

13 Claims, 2 Drawing Sheets

TEAT DETECTION DEVICE AND METHOD THEREWITH IN A MILKING DEVICE

CROSS REFERENCE TO RELATED APPLICATIONS

This application is a continuation-in-part application of U.S. patent application Ser. No. 12/439,824 filed on Mar. 4, 2009, as well as a continuation of PCT application number PCT/NL2009/000084 filed on 7 Apr. 2009, which claims priority Netherlands application number 1035270 filed on 9 Apr. 2008, the contents of all applications are hereby incorporated by reference in their entirety.

BACKGROUND OF THE INVENTION

1. Field of the Invention

The invention relates generally to a detection device and more particularly to a device and method of determining position information of an object in an animal related treating device using a detection device that has an absolute sensitivity maximum with a wavelength between 400 and 570 nm, and/or that the light source has an absolute emission maximum with a wavelength between 400 and 570 nm.

2. Description of the Related Art

WO2008/030086, hereby incorporated by reference in its entirety, discloses a device for automatically milking a dairy animal, wherein a light source emits modulated light which is received in a 2D classification of light receivers. From measured phase differences between received and emitted light a 3D image of for example the udder can be obtained.

A drawback of the known devices is that they are often unable to determine a sufficiently accurate distance in practice. This is often undesirable, for example if the detection device is used to determine the position of, or the distance to, an udder or a teat of a dairy animal.

Therefore, the invention aims at providing a detection device which has an improved accuracy, in particular with respect to the distance information to be obtained.

BRIEF SUMMARY OF THE INVENTION

The present invention addresses these problems by providing a device and method of determining position information of an object in an animal related treating device using a detection device that has an absolute sensitivity maximum with a wavelength between 400 and 570 nm, and/or that the light source has an absolute emission maximum with a wavelength between 400 and 570 nm.

It has been found that the accuracy with which in particular distances, but as a derivative positions as well, can be established at such wavelengths, is often considerably better than at the wavelengths in the (near infra)red used in conventional devices. For example, when using infrared, the distance to a teat may in practice show a difference up to 2 cm from the actual distance, while, when using light according to the invention, i.e. for example green, blue or violet light, this difference has been reduced to almost zero. Without deeming herself to be bound by an explanation, it is supposed that this is caused by the fact that the known (infra)red light has a great penetrating power, so that the physical interface or the skin surface which is important for the distance determination, will be crossed, and there will occur a smearing out with deeper situated reflecting or scattering layers. It will, for example, be possible for a teat to be penetrated by (infra)red light over a considerable distance (in principle approximately the measured 1 cm to 2 cm). Partly by the presence of blood below the upper skin layers, whose red colour may produce a relatively strong reflection or scattering signal, the signal may be disturbed to a relatively large extent. When using shorter-wave-length light according to the invention, this effect is much smaller. It should be noted that the use of UV-light with a wavelength smaller than 400 nm is advised against because of sanitary risks and also because of possible fluorescence phenomena.

In this context, by "absolute maximum" is meant a non-local maximum over the entire visible range including the near infrared (IR-A of 750-1400 nm), in the light which has effectively been emitted to the environment, and the light which has been received from the environment and has been measured, respectively. Furthermore, a light source is a light generator, possibly combined with a filter, so that the light source is the whole that emits light to the environment.

WO 2004/012269, which is hereby incorporated by reference in its entirety, comprises a distance measuring device with a pulsed light source and a CMOS photo sensor classification for determining the distances from measured phase differences, and a 3D image on the basis thereof. The problem solved in this document, namely simpler integration with cheap and simple, energy-saving CMOS technologies, does however not relate at all to the present problem upon measuring distances to udders. Therefore, the document does not contain any clue to the present invention. Neither JP10026667, which is hereby incorporated by reference in its entirety, which discloses a distance measuring system for motorcars while using a blue light sensor, has anything to do with a present problem, while, for example, document WO 2008/030086 and EP 1253440, both of which are hereby incorporated by reference in their entirety, which disclose a laser distance measuring system for teat detection, lead away from the present invention by indicating a preference for near infrared light and a wave-length-rage of 600-900 nm, respectively.

In the present invention, preferably, one of the sensitivity maximum and the emission maximum lies between 450 and 570 nm. In this case, the chance of afterglowing of an object to be measured, or a part thereof, under the influence of short-wave light, such as violet light, is kept as small as possible.

According to the invention, the light measuring device comprises a 2D classification of light sensitive elements, and the signal processing device advantageously comprises an object recognition device. By means of such a 2D classification it is possible to form a spatial image, because distance information can be obtained in two dimensions.

The mentioned object recognition device serves to recognize in the 2D-image one or more objects which, for example, serve as a reference, or which are established to be actually the object to which the distance should be determined. In particular, a teat cup or liner thereof or a teat or udder, may for example be recognized by object recognition devices known in this field and arranged for this purpose. Accordingly, in the invention, the object recognition device is arranged to recognize an udder and/or a teat and/or a teat cup, and/or a respective part thereof. It should be noted that other objects, such as a leg of an animal or a fencing or other recognition point, may, of course, also form the object in question. It should be noted that the object recognition device may also constitute part of a control device such as a computer, and may for example be a module or program therein. More in particular, the object recognition device is arranged to determine a distance between a part of an animal, in particular a teat, and an external object or device, in particular a teat cup. On the basis thereof, it is possible to achieve in a very effective manner a control for displacing the external object or device.

In particular, the light source is arranged to emit modulated light, and the light measuring device and the signal processing device are arranged to determine a phase difference between the emitted light and the reflected light. Here, it applies that at least one of the mentioned devices should be arranged accordingly, all this in such a manner that the unit, i.e. the detection device as a whole, is able to determine said phase difference, in particular for each light sensitive element individually. For further details regarding this, such as techniques for extracting the distance information, reference is expressly made to, in particular, the figure description of the already mentioned WO2004/012269, and also to WO2008/030086, both of which are hereby incorporated by reference in their entirety. In embodiments, the light source has a modulation frequency of at least 20 MHz, preferably between 20 and 100 MHz. In the case of such modulation frequencies, on the one hand the uniquely determinable distance is sufficiently great, namely up to a maximum of 7.5 m, between 1.5 and 7.5 m, respectively, while on the other hand a sufficiently high phase measuring resolution and, consequently, distance resolution can still be safeguarded in a relatively simple manner. Of course, the frequency may also be determined on the basis of a desired modulation wavelength adjustment.

Advantageously, the device, in particular the light source and the light measuring device, is switchable between at least two modulation frequencies. It is, for example, possible to use a lower frequency for a rough determination, and subsequently a higher frequency, which has a corresponding smaller uniquely determined range but which has indeed a higher resolution, for a further precise determination. All this has been described in detail in WO2008/030086, in particular in claim 14 thereof, as well as in the associated parts of the preamble description and the figure description, which is hereby incorporated by reference. It should be noted that as a result thereof other frequency ranges may be useful, such as a lower modulation frequency for the rougher determination, for example of 5 MHz, and/or a higher frequency for the more precise determination, such as up to 200 MHz. Other modulation frequencies are, incidentally, not excluded.

As an alternative, a time-of-flight sensor device is, for example, possible as well, the time-of-flight of the light then being measured each time. More in particular, the light measuring device and the signal processing device are arranged to determine a phase difference between the emission of the light and the measurement of the reflected light. A distance can be measured hereby in a very simple manner, although the times-of-flight and the differences therein (for the resolution) are very small. For example, the time-of-flight for a distance of half a meter is only 3 ns, and the time-of-flight difference for a resolution of 1 cm is only approximately 65 ps.

The measuring device may be provided with an optical device to display the reflected light on the measuring device, in particular on the 2D classification. Moreover, the advantage of the invention applies in principle also to, for example, triangulation measurements by means of one or more laser beams, such as known for red light for example from EP 1253440 which is hereby incorporated by reference in its entirety.

In particular, the device comprises an additional light source having an emission maximum with a wavelength between 600 and 1000 nm. The light source and/or the additional light source advantageously comprise(s) a LED or laser. The light source and/or the additional light source advantageously comprise(s) a plurality of partial light sources, for a higher power but also for a higher reliability in operation. For, it is possible for the device still to operate as a whole, also at a lower capacity as a result of poorly or not functioning of one or more partial light sources. The additional light source is preferably controllable by the control device which can advantageously alternate the light source and the additional light source, or operate them simultaneously, if desired. It should be noted here that it thus becomes possible to select a stronger or lower interference signal, which signal, of course, is partly determined by colour-dependent reflection properties. The additional light source may, in particular, advantageously be used for a first, rough distance measurement. For, (near infra)red LED's or lasers with a great capacity are widely available, while this applies to a much lesser extent to, in particular, LED's in the wavelength range according to the invention. The latter may then be used advantageously for the more precise position determination, for example after the rough position has first been determined. This is in particular the case if the capacity and/or the efficiency of the used shorter-wave-length light source are/is smaller than that/those of the additional light source. In practice, for example, a blue LED is often (much) less powerful than a (near infra)red LED, and has a lower efficiency. If the less strong or less efficient light source would also be used for the greater distances, such as the rough initial measurement/adjustment, this would be unnecessarily disadvantageous, causing more energy consumption and/or cooling, or even a lower resolution, more interference and the like. By properly making use of the positive properties of both types of light, it is possible to achieve a particularly efficient detection device.

The light source(s) and/or the additional light source(s) are/is preferably positioned close to the light measuring device, so that the distance information becomes reliable by preventing different light paths.

In embodiments, the additional light source has a lower modulation frequency than that of the light source, in particular between 10 and 75 MHz. This provides an area of uniquely determinable distances between 2 and 15 meters, which is found to be a useful range. Other modulation frequencies are, however, not excluded. It should be noted that, for a time-of-flight sensor, it is not necessary to modulate the light source or the additional light source.

The invention also relates to an animal treating device for treating an animal, which comprises a detection device according to the invention. Examples are a control room or the like, where an animal treatment is prepared, a feeding area or a feeding device, etc. In such cases, the detection device serves in particular to already determine a position of or distance to an udder, teat etc., which can subsequently be used in or transmitted to, for example, a milking box or the like, which is subsequently visited. An animal treating device is in particular a device which is arranged to position automatically, i.e. without human intervention being required, a part thereof or an external device or object with respect to an animal to be treated, in such a manner that an animal treatment can be performed by means of that component, device or object. In particular, the animal treating device relates to a device for automatically positioning a teat cup on a teat of a dairy animal, and more in particular to a robotic milking device comprising a robot arm for automatically applying a teat cup to an animal. However, the invention may, for example, also relate to a teat or udder cleaning device or a teat or udder stimulating device. Such devices are already widely known per se, and are of major economic importance. Consequently, improving the positioning reliability by means of a detection device according to the invention is deemed to be of great importance. It should be noted that animals, and in particular hairless parts thereof, such as teats, seem to have a relatively great transmissiveness of (infra)red light, so that, here, the advantage of the invention reveals itself clearly.

In particular, the animal treating device, more in particular a robot arm control of a robot arm thereof, is operatively connected to the detection device, for positioning the animal treating device with respect to the animal. Prior to the treatment, at least a part of the animal treating device or an external device or object will always be positioned with respect to the animal to be treated. If, for positioning, for example controlling a robot arm, use is made of position information obtained by means of the detection device, an enhanced reliability will be possible.

The invention also relates to a method of determining position information of an object in an animal related treating device by means of a detection device, which method comprises emitting light by means of a light source, measuring light reflected by the object, and generating a corresponding measuring signal, processing the measuring signal to position information of the object with respect to the detection device, which method is characterized in that light having an absolute emission maximum with a wavelength between 400 and 570 nm, preferably between 450 and 570 nm, is used.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
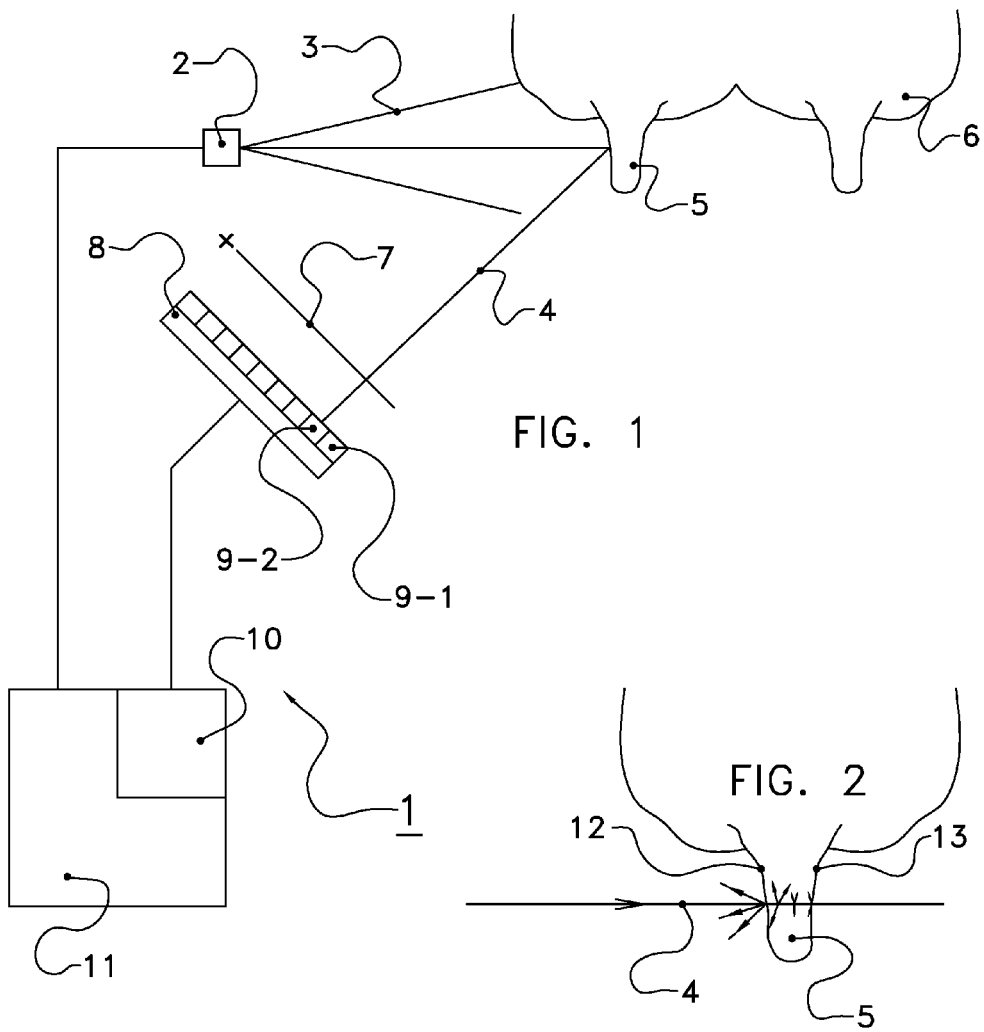
FIG. 1 is a schematic view of a device according to the invention.

The following is a description of certain embodiments of the invention, given by way of example only and with reference to the drawings. FIG. 1 schematically shows a detection device according to the invention. This detection device is generally denoted by reference numeral 1. Here, 2 is a light source which emits a beam of light 3 of which a light ray 4 reflects from a teat 5 of an udder 6. The light ray 4 goes via an optical device 7 to the light measuring device 8 having light sensitive elements 9-1, 9-2, . . . . By 10 is denoted a signal processing device which in this case is a component of a control device 11.

In an embodiment, the light source 2 is a LED which emits a light pulse in a beam 3. The emitted light will reflect from objects in the beam, such as a teat 5 of an udder 6 of a dairy animal in, for example, a milking box. It is possible for a light ray 4 reflected from the teat 5, after having passed through an optional optical device 7, to be displayed on an image element 9-2 of the light measuring device 8. It is then possible for the image element 9-2 to transmit a measuring signal to the signal processing device 10. The latter then determines, for example, the time elapsed between the emission of the light pulse by the light source 2 and the detection of the reflected ray 4 in the image element 9-2. It is then possible to determine, on the basis thereof, the distance from the light source 2 to the object (the teat 5) and the image element 9-2. In particular, if the light source is situated close to the light measuring device 8, the distance between the detection device 1 and the object is then equal to half the distance covered in the time-of-flight.

In the above-mentioned embodiment, the optical device 7, for example comprising one or more lenses for displaying the environment on the light measuring device 8, is optional. It is further possible for the light measuring device may to comprise only one light sensitive element. The signal processing device 10 is shown here as a component of the control device 11. The signal processing will often be performed by a computer, a module thereof or a program which is carried out therein. In principle, the signal processing device 10 and the control device 11 may also form a unit.

In this case, the light source 2 is for example a blue LED, with an absolute emission maximum at approximately 465 nm, such as a GaN-LED. A LED may be provided with a small lens in order to bundle the emitted light to a usable opening angle, such as 60°, 90°, etc.

In another embodiment, the light measuring device 8 does not determine the time-of-flight, but the phase difference which is built up by the light ray 4 between the moment of emission and the moment of detection, in other words how many wavelengths of the modulation fit between the light source 2 and the light measuring device 8 via the object, in this case for example the teat 5. For this purpose, the light source 2 is modulated, for example by means of a sinus or a square wave. The modulation frequency is selected in such a manner that the wavelength (or the wavelength equivalent thereof) matches the to be expected distances. For example, a modulation frequency of 100 MHz is selected. The maximum distance which can still be uniquely determined, because vice versa totally exactly one wavelength fits therein, is then 1.5 m. In order to determine the distance, the signal detected by the light measuring device 8 is compared with the emitted signal, i.e. with the applied modulation. The phase shifting determined thereby can be reconverted into the distance. Moreover, the combination of narrow-band light, such as for example emitted by a LED or laser, and the modulation thereof, make it possible to filter out a major part of the ambient light.

Practical tests with the latter embodiment and blue LED's provided reliable distance measurements at, for example, distances of half a meter. The values found did almost not deviate from the actual distance, while the same tests, but now performed by means of infrared LED's, provided distance deviations up to 2 cm.

Figure 2:
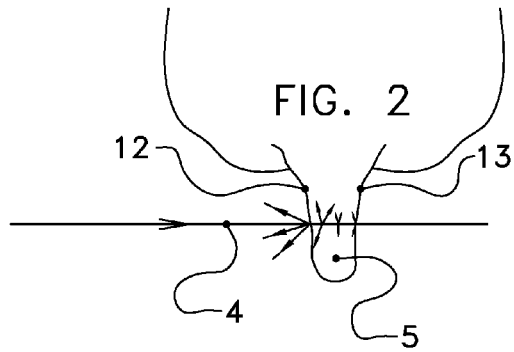
FIG. 2 is a schematic view of beams passing through a teat.

FIG. 2 schematically shows the manner in which a light ray 4 passes through a teat 5 having a teat front side 12 and a teat rear side 13. The light ray 4 will partly reflect and/or scatter from the teat front side 12, indicated by the different arrows, and furthermore also from other structures and materials in the teat 5. In particular from blood and blood vessels, red or infrared light will, for example, strongly reflect according to the state of the art. This is indicated in the figure by relatively big arrows, while these arrows will become smaller at greater distances according to the Lambert-Beer law. Subsequently, the ray will also partly reflect and/or scatter from the teat rear side 13, and part of the ray will leave the teat. Although the shown arrows are only an indication of reflection and/or scattering, it will be obvious that a reflected signal may also emanate from deeper layers of the object.

Figure 3A:
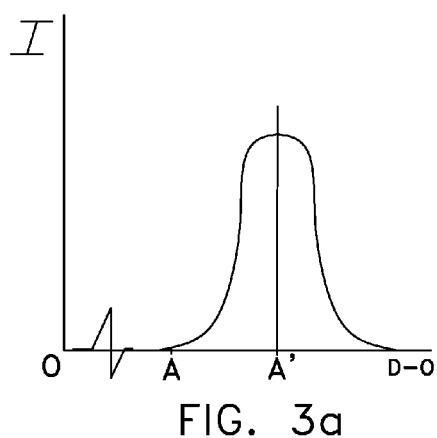
FIGS. 3a and 3b schematically show diagrams of measurements at different sorts of light, and FIG. 4 schematically shows an animal treating device according to the invention.

FIG. 3a schematically shows a processed measuring signal, while using (near) infrared light. Here, the x-axis is the distance d which contributes to the signal, and the y-axis is the (relative) intensity 1. It is clearly visible that there are contributions to the signal over a relatively great distance. As measured distance is used the maximum signal which lies at the distance A'. The actual distance A is depicted too in this figure, so that it will be clear that, in this case, the difference distance A-A' is relatively great. As already indicated above, this may, for example, be caused by contributions of reflection and/or scattering from deeper layers.

Figure 3B:
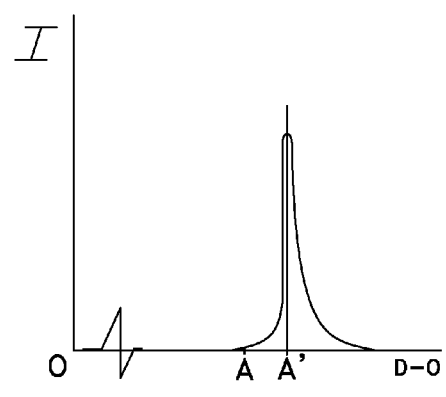

For comparison, FIG. 3b also schematically shows the same sort of figure, here blue light being used. It is clearly visible that there is a much smaller distance area which contributes to the total signal. Also here, the distance is determined as the distance at which the signal is maximum, in this case A'. The actual distance A has also been depicted. Here, the difference A-A' is almost nil, at least much smaller than for infrared light in FIG. 3a.

Figure 4:
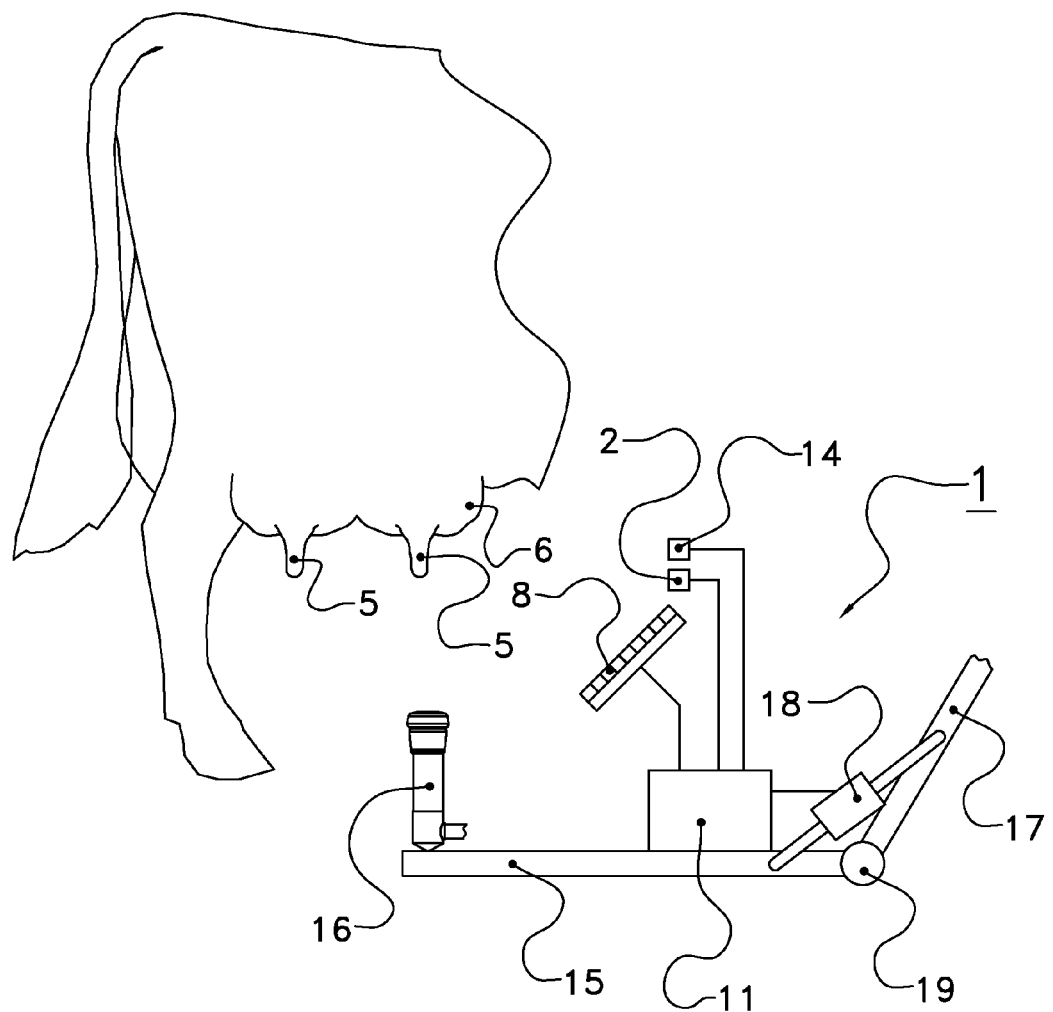

FIG. 4 schematically shows an animal treating device according to the invention. Here, corresponding components are denoted by the same reference numerals. Furthermore, by 14 is denoted an additional light source, and by 15 a robot arm portion, by 16 a teat cup, by 17 a robot arm portion, by 18 a controllable cylinder and by 19 a pivot.

The shown animal treating device is in this case, for example, a milking robot which is able to apply one or more teat cups 16 to teats 5 of an udder 6. In order to enable them to be applied, the teat cups 16 should be led to the teats 5, while making use of distance information which is determined by means of the detection device 1. For this purpose, when the distance to the teats 5 is still great, the additional light source 14 may, for example, first emit a strong light beam of a longer-wave-length sort of light, such as near infrared. On the basis of the determined distance, it is then possible for the control device 11 to roughly position the teat cup 16 with respect to the teats 5, by properly controlling the cylinder 18 which determines the position of the robot arm portions 15 and 17.

After this first phase, it is subsequently possible to put into operation the light source 2 which, for example, emits blue (or green or violet) light, and which makes it possible to determine the distance more accurately and more reliably.

In this animal treating device use is made of image recognition which is, for example, arranged for recognizing teats 5 in an image. Here, use may for example be made of the situation that a teat has specific average dimensions, and also a specific shape, in particular a downwardly rounded, cylindrical shape. Recognition of such structures in images is known per se.

It is further pointed out here that the use of shorter-wave-length light leads in practice to the detection device being less sensitive to different colours in the teats. There are, for example, dark coloured teats which showed differences at a distance measurement by means of infrared light. At a distance measurement with shorter-wave-length light according to the invention, the differences were found to be smaller.

Thus, the invention has been described by reference to certain embodiments discussed above. It will be recognized that these embodiments are susceptible to various modifications and alternative forms well known to those of skill in the art. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A detection device arranged to determine position information of a teat in an animal related treating device, wherein the position information comprises at least a distance from that object to the detection device, the detection device comprising:

a light source arranged to emit light;
   a control device arranged to control the light source;
   a light measuring device comprising a 2D classification of light sensitive elements and arranged to measure reflected light and to generate a corresponding measuring signal;
   a signal processing device arranged to process the measuring signal to position information, including distance information, of the teat with respect to the detection device, wherein the signal processing device comprises an object recognition device is configured to recognize at least one of: an udder, a teat, and respective parts thereof,
   wherein
   the light measuring device has an absolute sensitivity maximum with a wavelength between 400 and 570 nm, and
   the light source has an absolute emission maximum with a wavelength between 400 and 570 nm.

2. The device according to claim 1, wherein the light source is arranged to emit modulated light, and wherein the light measuring device and the signal processing device are arranged to determine a phase difference between the emitted light and the reflected light.

3. The device according to claim 1, wherein the light measuring device and the signal processing device are arranged to determine a time difference between the emission of the light and the measurement of the reflected light.

4. The device according to claim 1, comprising an additional light source having an emission maximum with a wavelength between 600 and 1000 nm.

5. The device according to claim 1, wherein the light source has a modulation frequency of at least 20 MHz.

6. The device according to claim 4, wherein the additional light source has a modulation frequency between 10 and 75 MHz.

7. The device according to claim 1, wherein the light source comprises a LED or a laser.

8. The device according to claim 4, wherein the additional light source comprises a LED or a laser.

9. Animal treating device for treating an animal comprising a robotic milking device having a robot arm for automatically applying a teat cup to the animal, wherein the animal treating device comprises a detection device comprising:

a light source arranged to emit light;
   a control device arranged to control the light source;
   a light measuring device comprising a 2D classification of light sensitive elements and arranged to measure reflected light and to generate a corresponding measuring signal;
   a signal processing device arranged to process the measuring signal to position information, including distance information, of a teat with respect to the detection device, wherein the signal processing device comprises an object recognition device is configured to recognize at least one of: an udder, a teat, and respective parts thereof,
   wherein:
   the light measuring device has an absolute sensitivity maximum with a wavelength between 400 and 570 nm, and
   the light source has an absolute emission maximum with a wavelength between 400 and 570 nm.

10. The animal treating device according to claim 9, wherein the robot arm control is operatively connected to the detection device in order to position the animal treating device with respect to the animal.

11. A method of determining position information of a teat in an animal related treating device, comprising a teat cup, using a detection device, comprising:
- emitting light by means of a light source;
- measuring light reflected by the teat with a light measuring device having an absolute sensitivity maximum with a wavelength between 400 and 570 nm, and generating a corresponding measuring signal;
- processing the measuring signal to position information of the teat with respect to the detection device,
- wherein the light source has an absolute emission maximum with a wavelength between 400 and 570 nm; and
- positioning the teat cup of the animal related treating device on the teat based on the position information.

12. An implement for automatically milking a dairy animal, comprising:
- a milking parlour;
- a sensor for observing a teat of the dairy animal; and
- a milking robot for automatically attaching a teat cup to the teat, the milking robot comprising a robot control unit operatively connected to the sensor,
- wherein the sensor comprises:
- a radiation source for emitting electromagnetic radiation having an absolute emission maximum with a wavelength between 400 and 570 nm,
- a receiver for receiving electromagnetic radiation reflected from the dairy animal, wherein the receiver has a sensitivity maximum between 450 and 570 nm;
- a lens for imaging the reflected electromagnetic radiation onto the receiver;
- a sensor control unit; and
- a matrix with a plurality of rows and a plurality of columns of receivers,
- wherein the sensor control unit is operatively connected to the radiation source to modulate the electromagnetic radiation, wherein the emitted electromagnetic radiation has a modulation wavelength of between 1 mm and 5 meters, and wherein the modulation wavelength is adjustable;
- wherein the sensor control unit determines repeatedly for each of the receivers a phase difference between the emitted and the reflected electromagnetic radiation to calculate distances from the sensor to a plurality of points on the dairy animal; and
- the robot control unit determines a position of the teat with the calculated distances between the sensor and the plurality of points on the dairy animal.

13. A detection device arranged to determine position information of a teat in an animal related treating device, wherein the position information comprises at least a distance from that object to the detection device, the detection device comprising:
- a light source arranged to emit light having an absolute emission maximum with a wavelength between 400 and 570 nm;
- a control device arranged to control the light source;
- a light measuring device comprising a 2D classification of light sensitive elements and arranged to measure reflected light and to generate a corresponding measuring signal;
- a signal processing device arranged to process the measuring signal to position information, including distance information, of the teat with respect to the detection device, wherein the signal processing device comprises an object recognition device is configured to recognize at least one of: an udder, a teat, and respective parts thereof,
- wherein the light measuring devices has an absolute sensitivity maximum with a wavelength between 400 and 570 nm.

* * * * *